UNITED STATES PATENT OFFICE.

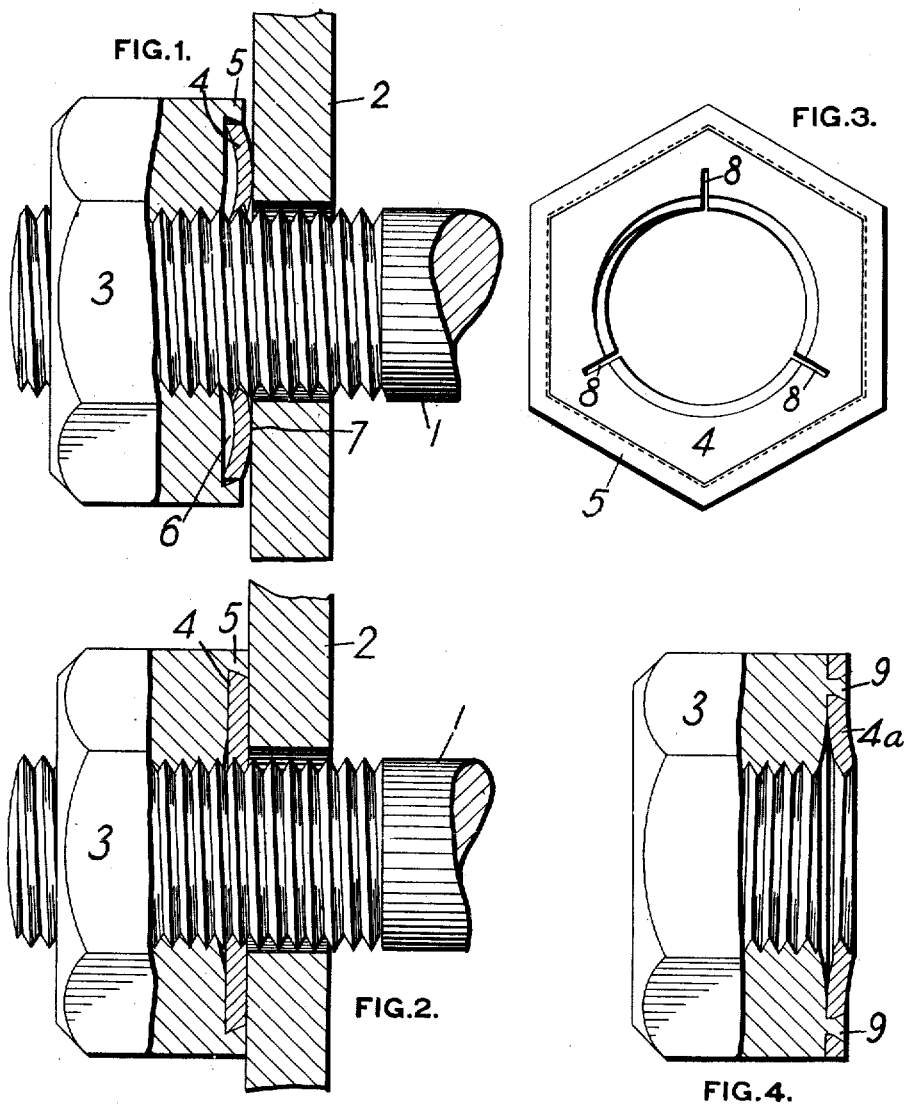

JAMES F. CRAVEN, OF PITTSBURG, PENNSYLVANIA.

NUT AND BOLT LOCK.

No. 915,830.  Specification of Letters Patent.  Patented March 23, 1909.

Application filed October 26, 1908. Serial No. 459,533.

*To all whom it may concern:*

Be it known that I, JAMES F. CRAVEN, a resident of Pittsburg, in the county of Allegheny and State of Pennsylvania, have invented a new and useful Improvement in Nut and Bolt Locks, of which the following is a specification.

This invention relates to nut and bolt locks, and more particularly to a self-locking nut. The object of the invention is to provide a nut with simple means by which it is securely locked to the bolt, but which, nevertheless, will not interfere with the removal of the nut when desired.

The invention comprises the construction and arrangement of parts hereinafter described and claimed.

In the accompanying drawing, Figure 1 is a sectional view showing the invention with the nut before being forced to final position; Fig. 2 is a similar view showing the parts after the nut has been forced to final position; Fig. 3 is a face view of the nut; and Fig. 4 is a sectional view showing a modification.

In the drawings 1 indicates a bolt, and 2 a suitable plate or body, such as a fish plate, which is fastened by the bolt. The nut has the main or body portion 3 which is provided with an opening and tapped for threads, as is the usual practice. The inner face of the nut is provided with the locking member. As shown, the locking member consists of a metallic disk or washer 4 provided centrally with an opening for the bolt, and at its outer edge secured to the nut to hold it from displacement and also prevent it from moving radially outwardly.

In Fig. 1 the disk or washer is seated in a depression in the inner face of the nut, being held by the peripheral portion 5 of the nut against moving radially outwardly. Preferably the part 5 is undercut and the washer is beveled, as shown in Figs. 1 and 2, so that after the washer is inserted, it cannot accidentally fall out. The disk or washer at its central portion is normally separated from the body of the nut as indicated by the space 6, Fig. 1, and said central portion normally projects away from and beyond the outer face of the body of the nut, as clearly shown in Fig. 1. Preferably also the disk is curved in a manner to get contact against the disk at a point slightly outside of its central edge, as for instance, at the point 7, Fig. 1. The disk or washer is threaded on a pitch corresponding to that of the threads of the body of the nut. This is done by tapping the nut body and washer or disk simultaneously, or at one operation.

When the nut is forced against the stationary plate 2, the central portion of the washer or disk 4 is pressed toward the body of the nut, and since it cannot move outwardly or radially, it acts on the principle of toggle levers, which when straightened out, exert a very strong pressure on the bottoms of the threads on the bolt. Furthermore, by pressing the washer or disk to the position shown in Fig. 2, said washer or disk tends to force the nut off the end of the bolt, while the threads of the washer exert a pressure on the sides of the threads opposite to the sides against which the nut presses. Consequently the threads on the bolt are practically clamped between the threads on the body of the nut and the threads on the washer. The consequence is that the nut is very securely held both by the toggle action of the washer exerting pressure on the bottoms of the thread, and by the closing up action of the washer and body, serving to clamp the threads of the bolt on both sides. This very securely holds the nut against accidentally turning, but does not prevent the nut from being removed. To remove the nut it is only necessary to exert the same amount of power on the nut as is necessary to force it to final position. The disk or washer preferably is slotted radially at several points, as indicated at 8, Fig. 3, in order to permit its inner portion to yield to get the toggle and clamping action. The amount of curvature and projection of the washer is considerably exaggerated in Fig. 1 in order to make the principle clear.

Fig. 4 shows a modification wherein the washer or disk 4ª is held by studs 9 on the nut projecting through holes in the washer and upset therein. These studs are shown as integral parts of the body of the nut, but obviously may be screws or rivets extending through the washer and into the body of the nut.

Various other modifications can be made without departing from the spirit of the invention. It is obvious that the slits 8 could be extended out to the outer edges of the washer or disk, so practically dividing the washer in three or more pieces, each constituting a separate toggle arm. The construction shown is preferred as it is easier to handle the single piece than the plurality.

The locking device is practically a part of the nut, and except for manufacturing purposes might be an integral part with the nut, secured at its outer edge to the nut, and having its central portion separated from and projecting away from the body of the nut. By having this locking member practically a part of the nut, there is no danger of its being lost in shipping and handling, and the nut and bolt can be applied and used in exactly the same manner as an ordinary bolt and nut.

What I claim is:—

1. A self-locking nut, comprising a nut body provided on its inner face with a toggle member permanently secured near its outer edge to the nut body to prevent radial movement and at the bolt hole being separated from and projecting away from the body and having its inner edge threaded on a pitch corresponding to that of the body of the nut.

2. A self-locking nut, comprising a nut body and a perforated disk or washer secured at its outer edge to one face of the nut body to prevent radial movement and having its central portion separated from and projecting away from the body, said disk being slit radially and being threaded on a pitch corresponding to the threads in the nut body.

3. A self-locking nut, comprising a nut body provided on its inner face with a toggle member secured near its outer edge to the nut body to prevent lateral movement and toward the bolt hole projecting away from the body and at the bolt hole projecting toward the body but out of contact therewith, said member having its inner edge threaded to correspond to the thread in the nut body.

4. A self-locking nut, comprising a nut body and a perforated disk or washer having its outer edge secured to one face of the nut body to prevent lateral movement and having its central portion curved and projecting away from the body and at the bolt hole curving toward the body but out of contact therewith, said disk being threaded on a pitch to correspond to the threads in the nut body.

In testimony whereof, I have hereunto set my hand.

JAMES F. CRAVEN.

Witnesses:
WILLIAM I. KING,
F. W. WINTER.